United States Patent [19]

Kaminski et al.

[11] Patent Number: 4,659,889
[45] Date of Patent: Apr. 21, 1987

[54] VEHICLE READING/COURTESY LAMP

[75] Inventors: Les K. Kaminski, Sterling Heights; Clyde Sheffield, Royal Oak, both of Mich.

[73] Assignee: Chrysler Motors Corporation, Highland Park, Mich.

[21] Appl. No.: 840,278

[22] Filed: Mar. 17, 1986

[51] Int. Cl.⁴ .............................................. H01H 19/00
[52] U.S. Cl. ................................... 200/330; 200/336; 200/153 T
[58] Field of Search ............... 200/336, 330, 331, 329, 200/155 A, 153 T

[56] References Cited

U.S. PATENT DOCUMENTS

| | | | |
|---|---|---|---|
| 2,124,009 | 7/1938 | Schneider | 200/330 |
| 2,449,213 | 9/1948 | Fredrick | 200/316 |
| 3,075,396 | 1/1963 | Smith | 74/104 |
| 3,356,819 | 12/1967 | Zavertnik et al. | 200/330 |
| 3,373,621 | 3/1968 | Mundschenk | 74/104 |
| 3,946,186 | 3/1976 | Howie, Jr. | 200/339 |

Primary Examiner—Stephen Marcus
Assistant Examiner—Renee S. Luebke
Attorney, Agent, or Firm—Edward A. Craig

[57] ABSTRACT

A vehicle reading/courtesy lamp is provided. The lamp includes a lamp body upon which is rotatably mounted a switch actuating ring. A switch is mounted within the lamp body. The switch includes a switch actuating lever which functions to turn the lamp on or off and to limit rotation of the ring with respect to the lamp body. The ring and lamp body are assembled together by means of spaced apart projections on each element. The spaced apart projections pass by each other upon assembly of the ring and lamp body and are moved to an overlapping position thereafter. The switch actuating arm prevents re-registry of the projections and spaces which would result in separtion of the ring and the lamp body.

4 Claims, 6 Drawing Figures

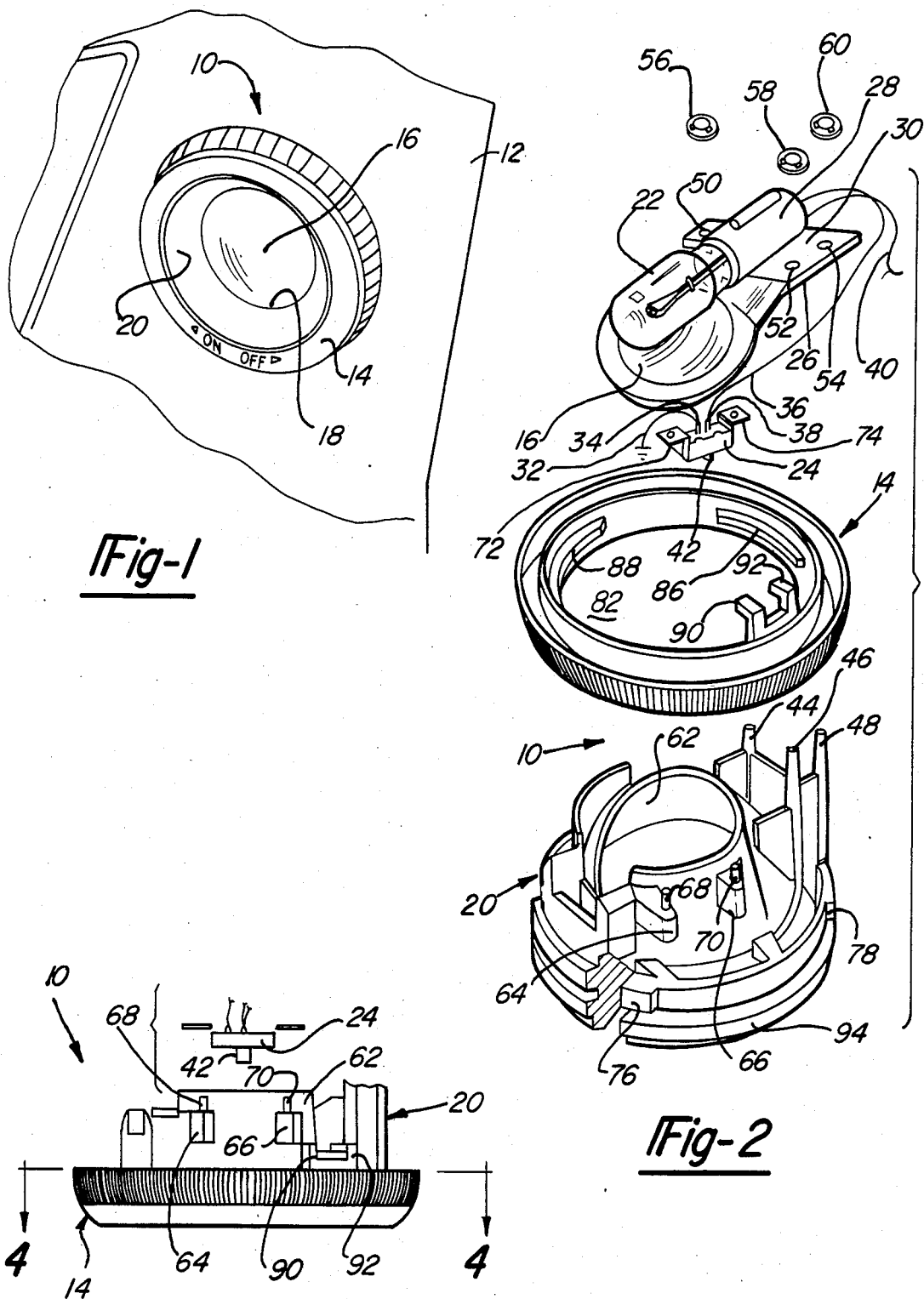

VEHICLE READING/COURTESY LAMP

BACKGROUND OF THE INVENTION

1. Field of the Invention

This invention relates to a vehicle reading/courtesy lamp of the type mounted on the interior of a vehicle for the convenience of occupants.

2. Prior Art

It is common practice to provide interior lighting within vehicles to facilitate people getting in and out, finding or handling articles within the vehicle, and reading such things as maps and addresses. One problem associated with lamps which have been provided in the past has been finding the switch actuating lever in the dark. Such levers are relatively small and must be found by feeling around the lamp structure.

In accordance with the present invention, such a lamp is provided having a rotatable switch actuating ring therearound. It is only necessary for an occupant of the vehicle to locate the lamp fixture and then grasp the outside periphery of the lamp (where the ring is located) and turn the ring to switch the lamp on.

The ring itself has a pair of spaced apart interior arms each of which is located on one side of a switch actuating lever, the lamp switch being located interiorly of the structure. Rotation of the ring in one direction will cause one of the arms to contact the switch actuating lever and move it to one position while turning of the ring in the opposite direction will cause the other of the arms to contact the switch actuating lever and move it to a second position, thus permitting switching of the lamp on and off by simple manipulation of the ring. This general technique, that is providing an arm on each side of switch lever with the arms being movable by means of a knob or the like to cause switch actuation, has been suggested in the past. For example, the broad use of such structure has been disclosed in U.S. Pat. Nos. 2,449,213, Fredrick, Sept. 14, 1948; 3,075,396, Smith, Jan. 29, 1963; 3,356,819, Zavertnik et al, Dec. 5, 1967; and 3,373,621, Mundshenk, Mar. 19, 1968.

However, in accordance with the present invention, such structure is not only used for the purpose of switching an electrical apparatus on and off, it is also used as a stop means for the ring to limit ring movement to a prescribed arc. This facilitates use of peripherally spaced apart projections on the interior of the ring and similar spaced apart projections on the exterior of the lamp body as a means for assembling these two elements in operative relationship. The projections and spaces are first placed in registry whereupon the ring is mountable on the lamp body. The two elements are subsequently rotated through an arc which causes the projections to overlap each other and thereby prevent separation of the elements. The limited movement permitted by the switch actuating lever of the ring with respect to the lamp body prevents re-registry of the projections and spaces thereby preventing separation of the elements.

SUMMARY OF THE INVENTION

A vehicle reading/courtesy lamp is provided. The lamp includes a generally cylindrical lamp body having a central opening therethrough. A bulb is mounted on the lamp body and is positioned to cast light through the lamp body opening. The switch actuating ring is provided on the lamp body. The ring has at least one inwardly extending projection on the inner periphery thereof. The lamp body has at least one radially outwardly extending projection on the outer periphery thereof. The ring is rotatably mounted on the lamp body with the projections initially passing by each other and with the ring and lamp body subsequently being rotated relative to each other to place the projections in overlapping relationship to prevent separation of the ring and lamp body. An electrical switch is connected to the bulb and connectable to electric power to control energization of the bulb. The switch is mounted on one of the ring and lamp body. The switch has a switch actuating lever extending towards the other of the ring and lamp body. The other of the ring and lamp body has a pair of spaced apart arms, each of which extends to one side of the switch actuating lever. One of the arms is in contacting relationship with the switch actuating lever upon relative rotation of the ring and lamp body in one direction and the other of the arms is in contacting relationship with the switch actuating lever upon relative rotation of the ring and lamp body in the opposite direction to permit turning of the switch on or off. The switch actuating lever limits relative rotation of the ring and lamp body to prevent the projections moving to position where they do not overlap thus preventing separation of the ring and lamp body.

Preferably, a plurality of spaced-apart radially inwardly extending projections are provided on the inner periphery of the ring and a plurality of spaced apart radially outwardly extending projections are provided on the outer periphery of the lamp body. The space between the projections on the ring and lamp body are of sufficient size to permit passage of the projections on the ring and lamp body by each other. Preferably, the projections and spaces therebetween are differently sized to permit passage of the projections on the ring and lamp body by each other in only one orientation of the ring and the lamp body. Preferably, the switch is mounted on the lamp body and the pair of spaced apart arms are provided on the ring.

BRIEF DESCRIPTION OF THE DRAWINGS

FIG. 1 is a view in perspective of one embodiment of a vehicle reading/courtesy lamp of the present invention illustratively mounted on an interior surface of a vehicle;

FIG. 2 is an exploded view of the vehicle reading/courtesy lamp of FIG. 1 in perspective;

FIG. 3 is a side elevational view of the vehicle reading/courtesy lamp illustrating the lamp after the ring has been mounted on the lamp body but before the ring has been rotated to a final position;

DETAILED DESCRIPTION OF A PREFERRED EMBODIMENT

Figure 4:
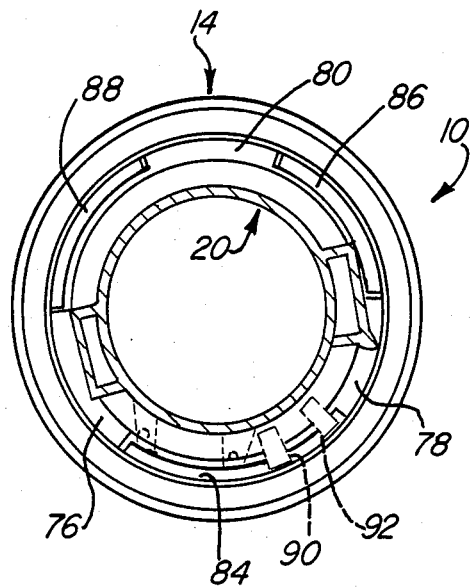
FIG. 4 is a sectional view taken substantially along the line 4—4 of FIG. 3 looking in the direction of the arrows.

Referring to FIG. 1, it will be noted that the vehicle reading/courtesy lamp 10 of the present invention is illustratively mounted on the "C" pillar 12 of a passenger car. This pillar 12 is the rearmost pillar of the car. The lamp 10 serves passengers in the rear seat, lighting up this portion of the vehicle for reading purposes or to provide light for any other need in the rear seat. As will be noted, the words "ON" and "OFF" with attendant arrowheads are provided to indicate which direction a ring 14 should be turned to switch the lamp 10 "ON" or "OFF". A lens 16 is provided in a central opening 18 of lamp body 20 to cast light in the desired direction. A bulb 22 (FIG. 2) is mounted behind the lens 16 and provides the source of light.

Referring now to FIG. 2, it will be noted that the lamp 10 comprises the ring 14, lamp body 20, electrical switch 24, and assembly 26. Assembly 26 comprises the lens 16, bulb 22, bulb holder 28 and mounting bracket 30. The bulb holder 28 is secured to the mounting bracket 30. A lead 32 extends from terminal 34 of the switch 24 to ground. A second ground lead 36 extends from the switch terminal 38 into connection with the bulb holder 28. A lead 40 extends from the bulb holder to a source of power. The circuit through the bulb 22 is made and broken through ground as is common in automotive applications. Any convenient ground connection may be used for the lead 32 as, for example, the lamp body 20 which is preferably fabricated of metal. The mounting bracket 30 is preferably fabricated of electrically insulating material such as a plastic to thereby insulate the bulb holder 28 from ground. As will be noted, the switch 24 has a switch actuating lever 42 which extends outwardly therefrom. Movement of the switch actuating lever 42 in one direction to one position will cause the switch to open thus breaking the circuit to the bulb 22 while movement of the lever 42 in the opposite direction to a second position will close the ground circuit to bulb 22 thus energizing the bulb.

The lamp body 20 is generally cylindrical and has an upstanding mounting bracket comprising three posts 44, 46, 48. The mounting bracket 30 has openings 50, 52, 54 which are received on the posts to mount the lens in place. Fasteners 56, 58, 60 are received on the posts to secure the lens assembly in place. The lens nests in a generally cylindrical structure 62 forming part of the lamp body 20. A pair of bosses 64, 66 are provided on the structure 62. Short posts 68, 70 extend from the bosses 64, 66. The switch 24 has tabs 72, 74 with openings therein for reception on the posts 68, 70. The switch may be maintained in place by staking posts 68, 70.

Figure 5:
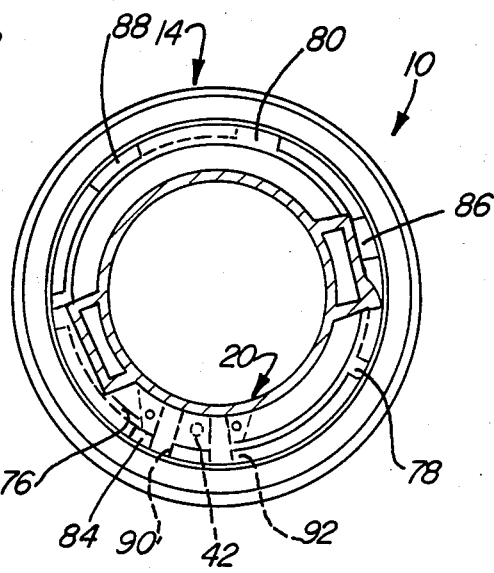
FIG. 5 is a sectional view similar to FIG. 4 illustrating the ring and lamp body in a position for mounting of the switch.

As will be noted in FIGS. 2, 4 and 5, the lamp body 20 has three spaced apart radially outwardly extending projections 76, 78, 80 on the outer periphery thereof which are used to secure the lamp body 20 and ring 14 together while permitting relative rotation thereof.

The ring 14, which defines a central opening 82 also has three spaced apart projections 84, 86, 88 which extend radially inwardly on the inner periphery thereof. The spaces between the projections on the ring 14 and lamp body 20 are of sufficient size to permit passage of the projections on the ring and lamp body by each other. As will be noted in FIG. 4, the projections and spaces therebetween are differently sized to permit passage of the projections on the ring 14 and lamp body 20 by each other in only one orientation of the ring 14 and the lamp body 20. As will be noted, the projections 76, 78, 80 on the lamp body are progressively smaller while the spaces between the projections 84, 86, 88 of the ring 18 are progressively larger thus permitting the two parts to be put together in only the single orientation. This is advantageous in that the initial orientation necessary for assembly results in proper orientation of these parts after they are assembled together.

Figure 6:
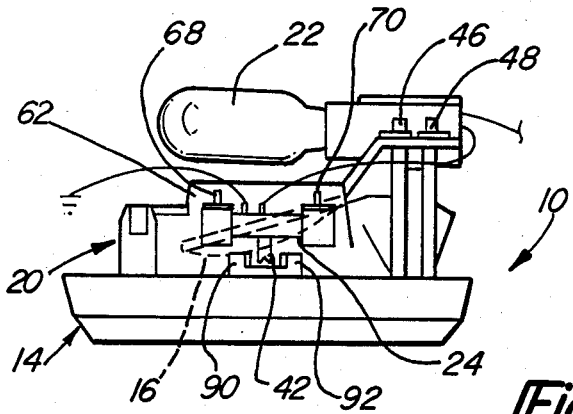
FIG. 6 is a side elevation view of the lamp after it is completely assembled.

The ring 14 is provided with a pair of spaced apart arms 90, 92 each of which extends to one side of the switch actuating lever 42 after the ring 14, and lamp body 20 and switch 24 are assembled together. The ring 14 is mounted on the lamp body with the projections 76, 78, 80 of the lamp body first being properly oriented with respect to the projections 84, 86, 88 of the ring as shown in FIG. 4. The lamp body is then axially inserted into the ring with the projections 84, 86, 88 initially passing by the projections 76, 78, 80 of the lamp body as shown in FIGS. 3 and 4. The parts are then rotated to the position shown in FIG 5. In this position, the arms 90, 92 are located to one side of the switch mounting posts 68, 70. Then, as shown in FIG. 5, the ring 14 and lamp body 20 are subsequently rotated relative to each other to place the projections 76, 78, 80 and 84, 86, 88 of the lamp body and ring 14 in overlapping relationship as shown. This prevents separation of the ring and lamp body. When the ring 14 and lamp body 20 have been thus rotated, the arms 90, 92 are centered between the posts 68, 70 as shown in FIG. 6. The switch 24 is then lowered onto the posts 68, 70 in the position illustrated in FIG. 6 with the switch actuating lever 42 extending between the arms 90, 92. The switch 24 is held in place by staking post and tab structure.

A circular rim 94 (FIG. 2) is provided on the outer periphery of the lamp body 20 to contact projections 84, 86, 88 and prevent the lamp body from passing entirely through the ring 14.

Referring to FIG. 6, it will be appreciated that relative rotation of the ring 14 and lamp body 20 in one direction will place the arm 90 in contacting relationship with the switch actuating lever 42 and relative rotation of the ring 14 and lamp body 20 in the opposite direction will place the arm 92 in contacting relationship with the switch actuating lever 42 thus permitting moving of the lever 42 to one position or another to open or close the switch 24. In addition to functioning as a switch actuator, the lever 42 acts as a stop, limiting relative rotation of the ring 14 and lamp body 20 to prevent the projections 76, 78, 80 and 84, 86, 88 moving to a position where they do not overlap. This prevents separation of the ring 14 and lamp body 20.

Having thus described my invention, I claim:

1. A vehicle reading/courtesy lamp comprising a generally cylindrical lamp body having a central opening therethrough, a bulb mounted on the lamp body and positioned to cast light through the lamp body opening, a switch actuating ring on the lamp body, the ring having at least one radially inwardly extending projection on the inner periphery thereof, the lamp body having at least one radially outwardly extending projection on the outer periphery thereof, the ring being mounted on the lamp body with the projections initially passing by each other and with the ring and lamp body subsequently being rotated relative to each other to place the projections in overlapping relationship to prevent separation of the ring and the lamp body, an electrical switch electrically connected to the bulb to control energization of the bulb, the switch being mounted on one of the ring and lamp body, the switch having a switch actuating lever extending towards the other of the ring and lamp body, the other of the ring and lamp body having a pair of spaced apart arms each of which extends to one side of the switch actuating lever, one of the arms being in contacting relationship with the switch actuating lever upon relative rotation of the ring and lamp body in one direction to move the lever to one position and the other of the arms being in contacting relationship with the switch actuating lever upon relative rotation of the ring and lamp body in the opposite direction to move the lever to a second position to permit turning of the switch on or off, the switch actuating lever limiting relative rotation of the ring and lamp body to prevent the projections moving to a position where they do not overlap thus preventing separation of the ring and lamp body.

2. A vehicle reading/courtesy lamp as defined in claim 1, further characterized in the provision of a plurality of spaced apart radially inwardly extending projections on the inner periphery of the ring, a plurality of spaced apart radially outwardly extending projections on the outer periphery of the lamp body, the spaces between the projections on the ring and lamp body being os sufficient size to permit passage of the projections on the ring and lamp body by each other.

3. A vehicle reading/courtesy lamp as defined in claim 2, further characterized in that the projections and spaces therebetween are differently sized to permit passage of the projections on the ring and lamp body by each othe at only one orientation of the ring and the lamp body.

4. A vehicle reading/courtesy lamp as defined in claim 1, further characterized in that the switch is mounted on the lamp body and the pair of spaced apart arms are provided on the ring.

* * * * *